United States Patent
Carrie et al.

(10) Patent No.: US 11,319,007 B2
(45) Date of Patent: May 3, 2022

(54) METHOD FOR MOUNTING A FRONT STRUCTURAL ELEMENT OF A BODY SHELL

(71) Applicant: RENAULT s.a.s., Boulogne-Billancourt (FR)

(72) Inventors: Julien Carrie, Versailles (FR); Edouard Girault, Marcilly sur Eure (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 17/044,903

(22) PCT Filed: Mar. 15, 2019

(86) PCT No.: PCT/EP2019/056587
§ 371 (c)(1),
(2) Date: Oct. 2, 2020

(87) PCT Pub. No.: WO2019/192824
PCT Pub. Date: Oct. 10, 2019

(65) Prior Publication Data
US 2021/0147020 A1    May 20, 2021

(30) Foreign Application Priority Data
Apr. 3, 2018 (FR) .................................. 18 52860

(51) Int. Cl.
*B60J 7/00* (2006.01)
*B62D 65/02* (2006.01)
(Continued)

(52) U.S. Cl.
CPC ......... *B62D 65/024* (2013.01); *B62D 25/082* (2013.01); *B62D 29/008* (2013.01)

(58) Field of Classification Search
CPC ........ Y02E 60/10; H04L 5/0053; Y02P 70/50; A61B 5/7435; C08L 67/00; A63C 9/005;
(Continued)

(56) References Cited

U.S. PATENT DOCUMENTS 1,852,860 A * 4/1932 Schulman ............... B60B 15/00
188/5
5,031,958 A * 7/1991 Fujita ................... B62D 25/088
296/203.02
(Continued)

FOREIGN PATENT DOCUMENTS

| EP | 1 880 784 A2 | 1/2008 |
| EP | 1 912 850 B1 | 2/2017 |
| FR | 3 010 966 B1 | 9/2017 |

OTHER PUBLICATIONS

International Search Report dated Jun. 6, 2019 in PCT/EP2019/056587 filed on Mar. 15, 2019, 2 pages.

*Primary Examiner* — Kiran B Patel
(74) *Attorney, Agent, or Firm* — Oblon, McClelland, Maier & Neustadt, L.L.P.

(57) ABSTRACT

A structural element of a body shell, which includes a firewall, two front steel fins and two steel side rails, is mounted by: a) providing a structural element made of aluminium alloy and including, a top, and an inner side edge opposite an outer side edge; b) placing the structural element adjacent to the firewall, while the outer side edge is connected together with one of the front fins and the inner side edge is connected with one of the corresponding side rails. In step a), an outer side mounting part made of steel is also provided and secured to the outer side edge.

8 Claims, 3 Drawing Sheets

(51) Int. Cl.
*B62D 25/08* (2006.01)
*B62D 29/00* (2006.01)

(58) Field of Classification Search
CPC ............... A47C 1/0345; C07D 417/12; A01K 2217/05; A01K 67/0275
See application file for complete search history.

(56) References Cited

U.S. PATENT DOCUMENTS

| | | | |
|---|---|---|---|
| 9,956,991 B1* | 5/2018 | Nishikawa | B62D 21/02 |
| 2015/0054312 A1* | 2/2015 | Hisazumi | B62D 25/082 |
| | | | 296/193.09 |
| 2016/0264176 A1* | 9/2016 | Balzer | B62D 27/02 |
| 2019/0039652 A1* | 2/2019 | Kamei | B62D 25/081 |
| 2021/0053623 A1* | 2/2021 | Shimokouchi | B62D 25/082 |
| 2021/0061368 A1* | 3/2021 | Satoh | B62D 25/02 |

* cited by examiner

METHOD FOR MOUNTING A FRONT STRUCTURAL ELEMENT OF A BODY SHELL

The present invention relates to a method for mounting a front structural element of a body shell of a motor vehicle.

The present structural element has a top forming a suspension housing. The element also has an internal lateral edge and an external lateral edge that is raised in relation to the internal lateral edge.

Motor vehicle body shells are made of steel and have an engine compartment positioned at the front of the vehicle, said engine compartment being delimited transversally from a passenger compartment by a front bulkhead. Furthermore, the engine compartment is delimited laterally by two opposing lateral wings.

The body shell also has two side rails extending longitudinally from the front bulkhead, inside the engine compartment and respectively close to the two opposing wings.

Furthermore, the body shells are fitted with two opposing structural elements bearing against the corresponding wings and side rails respectively to the side and against the front bulkhead to the rear. More specifically, the two structural elements are arranged above the front wheel arches of the motor vehicles, in order to receive the suspension.

Normally, the structural elements are made of steel and brought into contact with the front bulkhead to be fastened to the body shell, while the external lateral edges are welded to the corresponding front wings and the internal lateral edges are welded to the corresponding side rails respectively.

The steel-on-steel welds are made using robots installed along the vehicle assembly lines and the welding pliers thereon.

The use of aluminum alloy structural elements has been proposed to reduce the weight of body shells. As a result, such structural elements cannot be welded using the normal means. Self-pierce rivets and glue are then used.

Consequently, such a change to the method for mounting structural elements requires a costly adaptation of the assembly line environment.

Furthermore, a problem that arises, and that the present invention is intended to resolve, is how to provide a mounting method that obviates at least some of the additional costs related to using aluminum-alloy structural elements in steel body shells.

For this purpose, and according to a first aspect of the invention, a method is proposed for mounting a front structural element of a motor-vehicle body shell, said body shell comprising firstly an engine compartment the limited transversely by a front bulkhead and laterally by two steel front wings, and secondly two steel side rails extending longitudinally inside said engine compartment close to said wings respectively, said method comprising the following steps: a) a structural element made of aluminum alloy is provided, comprising firstly a top, forming a suspension housing, and secondly an internal lateral edge and, on the opposite side, an external lateral edge that is raised in relation to said internal lateral edge, b) said structural element is brought into contact with said front bulkhead, while said external lateral edge is joined to one of said front wings and said internal lateral edge is joined to the corresponding side rail of said side rails respectively, and, during step (a), at least one steel external lateral assembly part is also provided and said at least one external lateral assembly part is rigidly connected to said external lateral edge to enable said at least one external lateral assembly part to be welded to said one wing of said front wings during step (b).

Thus, one feature of the invention is the use of at least one steel external lateral assembly part that is rigidly connected to the external lateral edge of the structural element before the structural element is installed. This enables the structural element to be mounted on the body shell and welded using normal means, such as welding pliers. Indeed, the steel external lateral assembly part is brought into contact with the internal wall of the front wing of the vehicle, which is also made of steel, and can then be welded thereto. It is understood that an aluminum-alloy part cannot be simply welded to a steel part by fusion of the two materials. The mounting method according to the invention now makes it possible to simultaneously assemble steel structural elements and aluminum-alloy structural elements fitted with at least one steel assembly part on steel body shells on the same assembly line using the same tools and without disturbing the assembly line.

Aluminum can be welded to steel under certain circumstances by friction. This naturally requires specific equipment.

Advantageously, during step (a), said at least one external lateral assembly part is rigidly connected to said external lateral edge by riveting. According to one variant embodiment, full rivets are then used. According to another advantageous variant, self-piercing rivets are used, thereby obviating the need for a prior piercing operation.

Furthermore, the lateral assembly parts can be rigidly connected to the external lateral edge using a friction welding method.

Furthermore, according to another embodiment, said at least one external lateral assembly part is rigidly connected to said external lateral edge by bolting. In some cases, such an embodiment is preferred.

Moreover, and according to a particularly advantageous embodiment of the invention, during step (a), at least one steel internal lateral assembly part is also provided and said at least one internal lateral assembly part is rigidly connected to said internal lateral edge to enable said at least one internal lateral assembly part to be welded to said one side rail of said side rails during step (b). Thus, similarly to the external lateral edge, the steel internal lateral assembly part is rigidly connected to the internal lateral edge of the structural element, either by riveting or by bolting, to enable the internal lateral assembly part to be subsequently welded to the corresponding side rail. The internal lateral assembly part is also welded to the side rail using normal welding means on the assembly line.

Preferably, during step (a), at least one steel transverse assembly part is also provided and said at least one transverse assembly part is rigidly connected to said top of said structural element to enable said at least one transverse assembly part to be welded to said front bulkhead during step (b). As for the lateral assembly parts, the transverse assembly part is rigidly connected to the aluminum-alloy structural element by riveting or bolting, and the transverse assembly part is then welded to the front bulkhead using normal welding means.

Moreover, during step (a), another structural element made of aluminum alloy is preferably provided, comprising firstly another top, forming a suspension housing, and secondly another internal lateral edge and, on the opposite side, an external lateral edge that is raised in relation to said other internal lateral edge, while during step (b) said other structural element is brought into contact with said front bulkhead, and said other external lateral edge is joined to the other of said front wings and said other internal lateral edge is joined to the corresponding other side rail of said side rails, respectively. Two aluminum-alloy structural elements are thus assembled in the body shell of the motor vehicle, symmetrically in relation to one another about a median plane. Consequently, since aluminum alloy is more lightweight than steel, the body shell is made significantly lighter.

Furthermore, during step (a), at least another steel external lateral assembly part is also advantageously provided and said at least another external lateral assembly part is rigidly connected to said other external lateral edge to enable said at least one other external lateral assembly part to be welded to said other front wing of said front wings during step (b). The other external lateral assembly part is rigidly connected to the other external lateral edge by riveting or bolting. Furthermore, during step (a), at least one steel internal lateral assembly part is also provided and said at least one internal lateral assembly part is rigidly connected to said other internal lateral edge to enable said at least one other internal lateral assembly part to be welded to the other side rail of said side rails during step (b).

According to a second aspect of the invention, a front structural element of a body shell of a motor vehicle that is made of aluminum alloy is proposed for an assembly method as described above, said structural element comprising firstly a top, forming a suspension housing, and secondly an internal lateral edge and, on the opposite side, an external lateral edge that is raised in relation to said internal lateral edge, as well as at least one steel external lateral assembly part, said at least one external lateral assembly part being rigidly connected to said external lateral edge. The structural element thus fitted with the steel external lateral assembly part can therefore be installed in the body shell of a motor vehicle using normal welding techniques. Furthermore, the front structural element also has at least one steel internal lateral assembly part, said at least one internal lateral assembly part being rigidly connected to said internal lateral edge.

Further details and advantages of the invention are set out in the description of a specific embodiment of the invention given below as a non-limiting example, with reference to the attached drawings in which.

Figure 1:
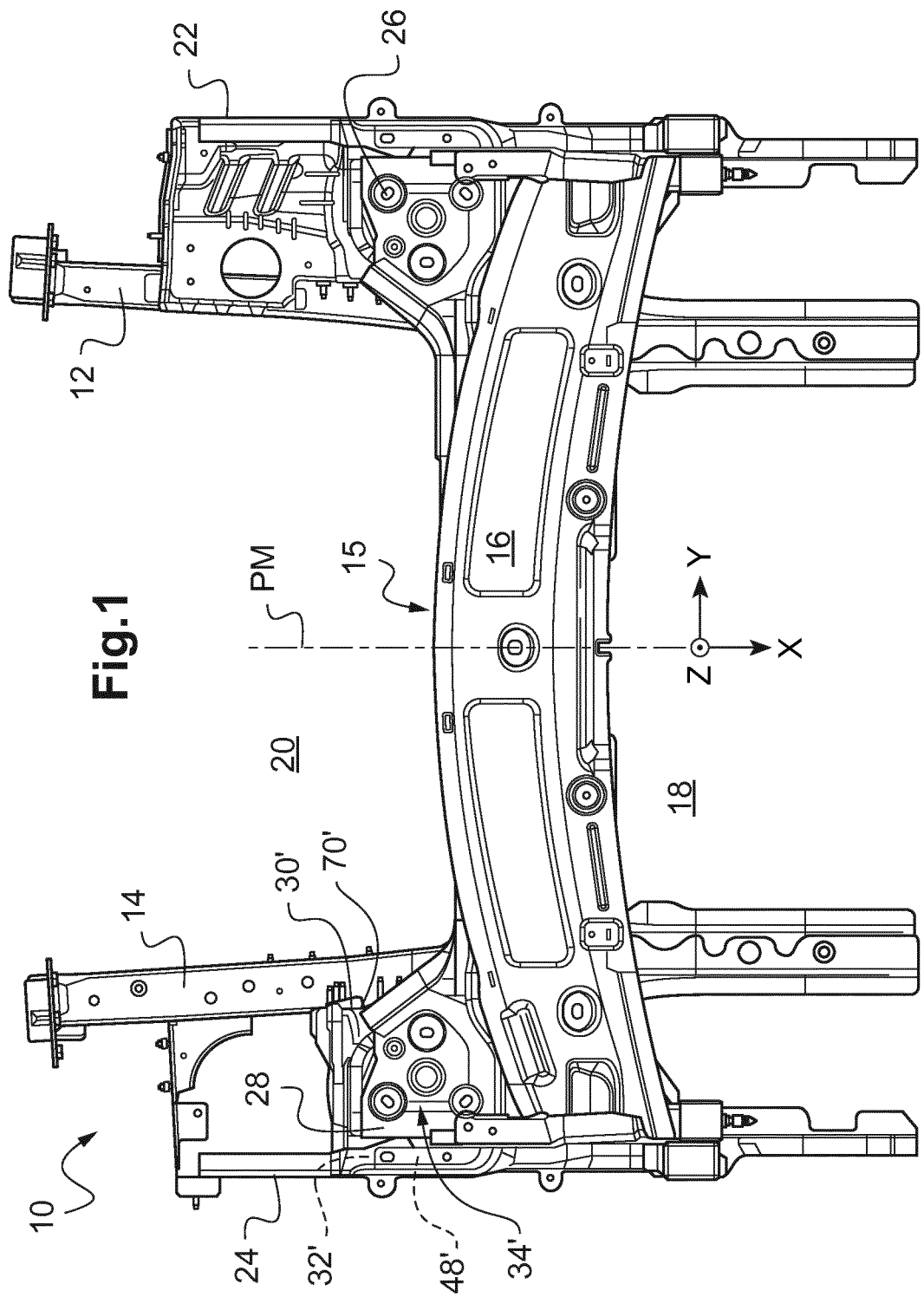
FIG. 1 is a partial schematic top view of a front portion of a body shell.

FIG. 1 is a partial top view of a front portion 10 of a body shell of a motor vehicle, including two parallel steel side rails extending longitudinally, a right-hand side rail 12 and a left-hand side rail 14, and a front bulkhead 15 extending transversely and traversed by the side rails 12, 14. The front bulkhead 15 has a bulkhead top 16 and separates the passenger compartment 18 from the engine compartment 20. Furthermore, the front portion 10 has two steel lateral wings, one right-hand wing 22 and one left-hand wing 24, extending respectively close to the right-hand side rail 12 and the left-hand side rail 14, and substantially parallel thereto. The front portion 10 also has two front structural elements, a right-hand front structural element 26 and a left-hand front structural element 28. The front structural elements 26, 28 are respectively brought into contact with the front bulkhead 15. The right-hand front structural element 26 is linked to the right-hand side rail 12 and to the right-hand wing 22, while the left-hand front structural element 28 is linked to the left-hand side rail 14 and to the left-hand wing 24. The linking method is described in greater detail in the description below.

Figure 4:
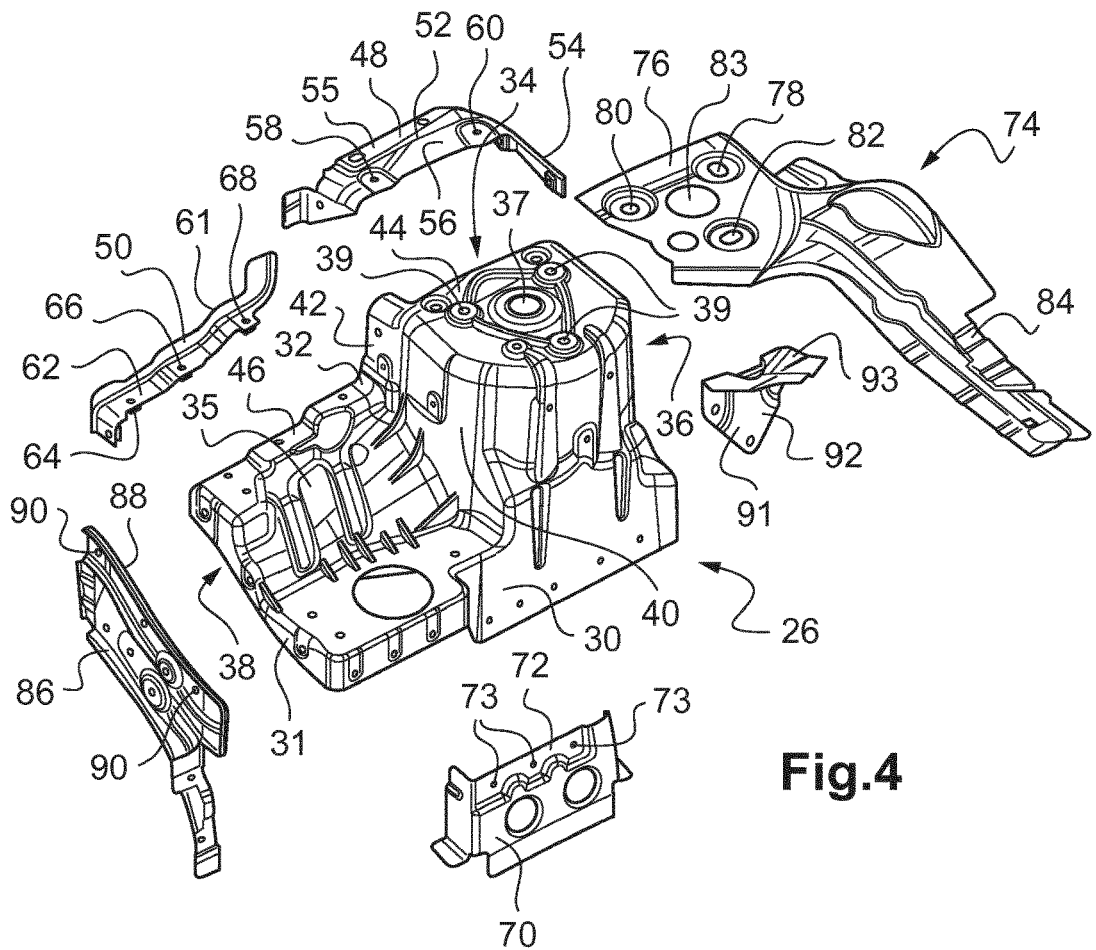
FIG. 4 is a schematic perspective exploded view of the element shown in FIG. 3.

Reference is made to FIG. 4, showing the right-hand front structural element 26 in detail. Said structural element is made of an aluminum alloy, for example including magnesium. The structural element has an internal lateral edge 30 and, on the opposite side, an external lateral edge 32 that is raised in relation to the internal lateral edge 30. As shown, the internal edge 30 extends to form a skirt and the external edge extends substantially perpendicularly to the internal edge 30. Furthermore, the right-hand front structural element 26 has, firstly, a top 34 positioned towards the rear and designed to form a suspension housing and, secondly, a front portion 35 towards the front. Moreover, the right-hand front structural element 26 has a rear face 36 opposite a front face 38. Furthermore, the internal edge 30 is extended by a front edge 31 that extends over the front face 38 to form a skirt. Furthermore, the right-hand front structural element 26 is designed to be installed above the right-hand front wheel arch of the motor vehicle. As shown, the wall of the top 34 is substantially flat and has a central circular aperture 37 and three holes 39 arranged thereabout.

There is an extension 40 between the front portion 35 and the top 34 of the structural element 26. Furthermore, the external edge 32 has a projection 42 between an upper external edge 44 of the top 34 and a lower external edge 46 of the front portion 35.

In the mounting method according to the invention, two steel external lateral assembly parts are provided, an upper part 48 and a lower part 50. The upper external lateral assembly part 48 has a longitudinal portion 52 extending in a midplane and a turned portion 54. The longitudinal portion 52 has an upper fastening edge 55 and an upper fastening edge 56, in which two upper fastening orifices 58, 60 are formed. The lower external lateral assembly part 50 is an angle with a free flange 61 and a lower fastening flange 62, in which three lower fastening orifices 64, 66 and 68 are formed.

Preferably, a plate-shaped steel internal lateral assembly part 70 is also provided. This plate 70 has an internal upper fastening edge 72 in which internal upper fastening orifices 73 are formed.

Furthermore, and particularly advantageously, at least one plate-shaped steel transverse assembly part 74 is also provided, comprising firstly a flat fastening head 76 in which three lateral fastening orifices 78, 80, 82 and a central opening 83 are formed, and secondly a tail 84 extending the head 76.

A front fastening assembly part 86 is also preferably provided, said part having an upper front fastening edge 88 in which upper front fastening orifices 90 are formed.

Furthermore, a square assembly part 92 with a triangular fastening flange 91 and a linking flange 93, the function of which is explained below, is also provided. The triangular fastening flange 91 has fastening holes. The square assembly part 92 is made of steel.

Figure 3:
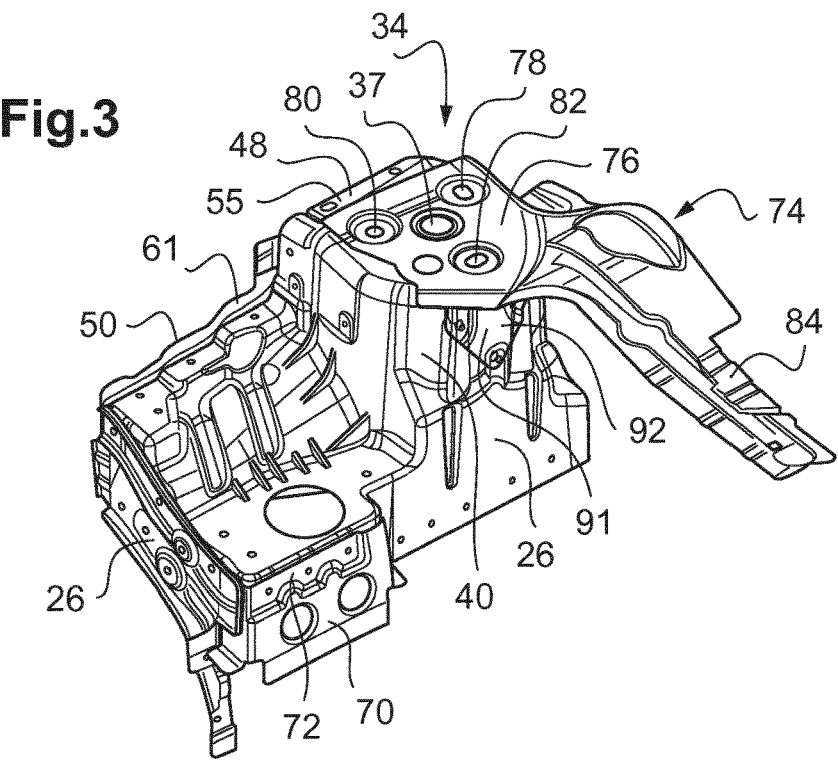
FIG. 3 is a schematic perspective view of an element shown in FIG. 2.

FIG. 3 shows all of the assembly parts described in FIG. 4, rigidly connected to the right-hand front structural element 26.

Thus, the upper external lateral assembly part 48 is rigidly connected to the upper external edge 44 via the upper fastening edge 56 thereof using full rivets respectively engaged through two upper fastening orifices 58, 60 and through the upper external edge 44. By positive engagement, the longitudinal portion 52 of the upper external lateral assembly part 48 is arranged perfectly on the top 34 of the right-hand front structural element 26, while the turned portion 54 is arranged on the top of the rear face 36.

Furthermore, the flat fastening head 76 of the transverse assembly part 74 cooperates with the top 34 of the right-hand front structural element 26 and is arranged thereon, overlapping the upper fastening edge 56 of the upper external lateral assembly part 48. The flat fastening head 76 is then rigidly connected to the top 34 of the right-hand front structural element 26 using full rivets engaged through three lateral fastening orifices 78, 80 and 82 and respectively through three holes 39 in the wall of the top 34. The central opening 83 leaves the central circular aperture 37 entirely uncovered. The tail 84 thus extends transversely in relation to the right-hand front structural element 26.

Moreover, in order to increase the rigidity of the link between the transverse assembly part 74 and the right-hand front structural element 26, the square part 92 is installed between a portion of the tail 84 adjoining the head 76 and the extension 40. The linking flange 93 is welded beneath the tail 84, while the triangular fastening flange 91 is riveted to the extension 40.

Furthermore, the lower external lateral assembly part 50 is rigidly connected to the lower external edge 46 via the free flange 61 thereof, which is arranged perfectly by positive engagement beneath the lower external edge 46. The free flange 61 and the lower external edge 46 are then riveted together using the lower fastening orifices 64, 66, 68.

In the same manner, on the opposite side, the plate-shaped steel internal lateral assembly part 70 is rigidly connected to the internal edge 30 via the internal upper fastening edge 72 thereof using full rivets engaged through the internal upper fastening orifices 73 and through the internal edge 30.

Finally, in the same manner, the front fastening assembly part 86 is riveted via the upper front fastening edge 88 thereof, which is arranged against the front edge 31.

Figure 2:
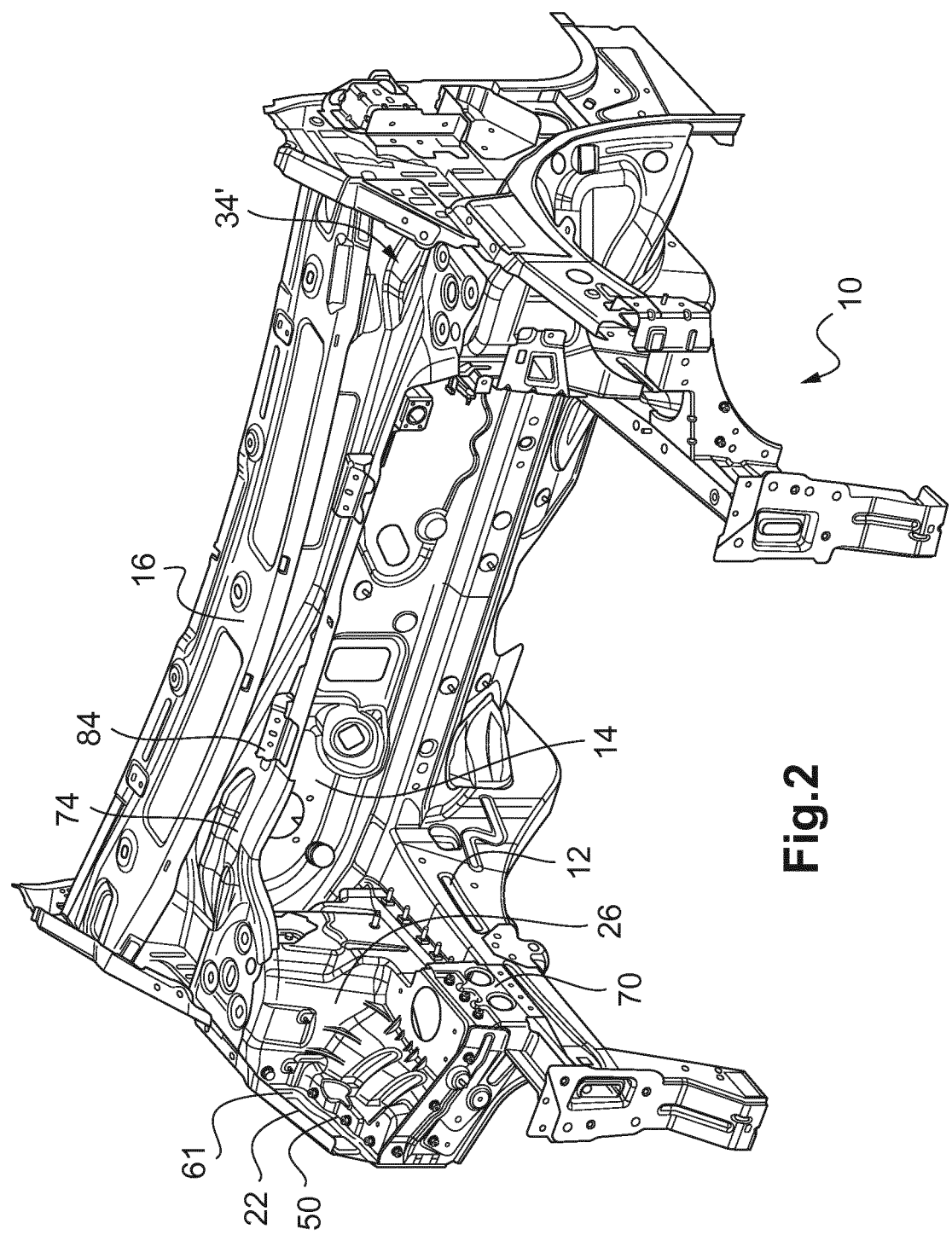
FIG. 2 is a partial perspective schematic three-quarter front-right view of the front portion of the body shell shown in FIG. 1.

This provides a right-hand front structural element 26 that is made of aluminum alloy and fitted about steel assembly parts 48, 50, 70, 74, 86, 92, enabling a normal welded join with the environment of the front portion 10 of a body shell of a motor vehicle. The right-hand front structural element 26 thus fitted is entirely similar to a right-hand front structural element made entirely of steel and can thus be kept in a store of an assembly line to be installed when required on certain models on the assembly line, FIG. 2 is a three-quarter right-hand front view of the front portion 10 of a body shell of a motor vehicle. The figure also shows the front bulkhead 15 surmounted by the bulkhead top 16. The right-hand front structural element 26 is then installed between the right-hand front side rail 12 and the right-hand wing 22 and brought into contact with the front bulkhead 15.

Moreover, the free flange 61 of the steel lower external lateral assembly part 50 is welded against the steel internal wall of the wing 22 using conventional normal welding means. The fastening edge 55 of the longitudinal portion 52 of the upper external lateral assembly part 58 is also welded against the upper edge of the right-hand front wing 22. On the opposite side, the plate-shaped steel internal lateral assembly part 70 is welded to the right-hand front side rail 12. Moreover, the tail 84 of the transverse assembly part 74 is welded along the front bulkhead 15.

To perfect the fastening of the right-hand front structural element 26, the internal edge 30 thereof is also joined perfectly by bolting to the side rail 12.

In the same manner, the left-hand front structural element 28, which is symmetrical with the right-hand front structural element 26 about a median plane shown in FIG. 1, is joined to the left-hand front wing 24, to the side rail 14 and to the front bulkhead 15 using steel assembly parts, while being made of aluminum alloy. These steel assembly parts are substantially identical to the assembly parts used for the right-hand front structural element 26, notwithstanding structural modifications as a function of the immediate environment.

Thus, the left-hand front structural element 28, shown in FIG. 1, is made of aluminum alloy and also has a top 34' forming a suspension housing. The portions of the left-hand front structural element 28 in common with the right-hand front structural element 26 have the same reference sign with an additional apostrophe (').

Furthermore, the left-hand front structural element 28 has another internal lateral edge 30' and another external lateral edge 32' on the opposite side. In the assembly method according to the invention, the left-hand front structural element 28 is brought into contact with said front bulkhead 15 and the other external lateral edge 32' is joined to the left-hand front wing 24, while the other internal lateral edge 30' is joined to the left-hand side rail 14.

To do so, another steel external lateral assembly part 48' is provided (hidden in FIG. 1 by the edge of the left-hand front wing 24). Another steel external lateral assembly part 48' is rigidly connected to the other external lateral edge 32' to enable subsequent welding to the left-hand front wing 28. The other external lateral assembly part 48' is rigidly connected to the other external lateral edge 32' by riveting or bolting.

Furthermore, a steel internal lateral assembly part 70' is provided and rigidly connected to the other internal lateral edge 30' to enable same to be welded to the left-hand side rail 14.

In the same manner, another steel transverse assembly part 74' is provided and rigidly connected to the top 34' of the left-hand front structural element 28 to enable same to be welded to the front bulkhead 15.

Furthermore, the subject matter of the invention also relates to a front structural element of a body shell of a motor vehicle that is made of aluminum alloy and designed to be used in an assembly method as described above. Consequently, the front structural element has two steel external lateral assembly parts 48, 50, one plate-shaped steel internal lateral assembly part 70, and one steel transverse assembly part 74. Preferably, the front structural element also has a square assembly part 92 and a front fastening assembly part 86.

The invention claimed is:

1. A method for mounting a front structural element of a motor-vehicle body shell, said body shell comprising an engine compartment limited transversely by a front bulkhead and laterally by two steel front wings, and two steel side rails extending longitudinally inside said engine compartment close to said wings respectively, said method comprising:
   a) providing a structural element made of aluminum alloy and comprising a top, an internal lateral edge, and an external lateral edge that is raised in relation to said internal lateral edge;
   b) rigidly connecting at least one steel external lateral assembly part to said external lateral edge of the structural element; and
   c) after b), welding said at least one external assembly to one of said front wings while bringing said structural element into contact with said front bulkhead, while said external lateral edge is joined to one of said front wings and said internal lateral edge is joined to the corresponding side rail of said side rails, respectively, such that the structural element made of aluminum forms a suspension housing.

2. The mounting method as claimed in claim 1, wherein, during b), said at least one external lateral assembly part is rigidly connected to said external lateral edge by riveting.

3. The mounting method as claimed in claim 1, wherein, during b), said at least one external lateral assembly part is rigidly connected to said external lateral edge by bolting.

4. The mounting method as claimed in claim 1, wherein, during b), at least one steel internal lateral assembly part is also provided and said at least one internal lateral assembly part is rigidly connected to said internal lateral edge to enable said at least one internal lateral assembly part to be welded to said one of said side rails during c).

5. The mounting method as claimed in claim 1, wherein at least one steel transverse assembly part is also provided and, during b), said at least one transverse assembly part is rigidly connected to said top of said structural element to enable said at least one transverse assembly part to be welded to said front bulkhead during c).

6. The mounting method as claimed in claim 1, wherein, during a), another structural element made of aluminum alloy is provided, comprising another top, another internal lateral edge, and another external lateral edge that is raised in relation to said other internal lateral edge, wherein, during c), said other structural element is brought into contact with said front bulkhead, and said other external lateral edge is joined to the other of said front wings, and said other internal lateral edge is joined to the corresponding other side rail of said side rails, respectively, such that said another structural elements forms a second suspension housing.

7. The mounting method as claimed in claim 6, wherein at least one other steel external lateral assembly part is provided and, during b), said at least one other external lateral assembly part is rigidly connected to said other external lateral edge to enable said at least one other external lateral assembly part to be welded to said other front wing of said front wings during c).

8. The mounting method as claimed in claim 7, wherein at least one steel internal lateral assembly part is also provided and, during b), said at least one internal lateral assembly part is rigidly connected to said other internal lateral edge to enable said at least one other internal lateral assembly part to be welded to the other side rail of said side rails during c).

* * * * *